US007224984B2

(12) United States Patent
Agrawala et al.

(10) Patent No.: US 7,224,984 B2
(45) Date of Patent: May 29, 2007

(54) METHOD, SYSTEM AND COMPUTER PROGRAM PRODUCT FOR POSITIONING AND SYNCHRONIZING WIRELESS COMMUNICATIONS NODES

(75) Inventors: Ashok Kumar Agrawala, Ashton, MD (US); Ronald L Larsen, Pittsburgh, PA (US); A. Udaya Shankar, Silver Spring, MD (US); Douglas C Szajda, Richmond, VA (US)

(73) Assignee: University of Maryland, College Park, College Park, MD (US)

( * ) Notice: Subject to any disclaimer, the term of this patent is extended or adjusted under 35 U.S.C. 154(b) by 785 days.

(21) Appl. No.: 10/344,857

(22) PCT Filed: Aug. 15, 2001

(86) PCT No.: PCT/US01/25381

§ 371 (c)(1),
(2), (4) Date: Sep. 30, 2003

(87) PCT Pub. No.: WO02/15614

PCT Pub. Date: Feb. 21, 2002

(65) Prior Publication Data

US 2005/0020275 A1    Jan. 27, 2005

Related U.S. Application Data

(60) Provisional application No. 60/225,592, filed on Aug. 15, 2000.

(51) Int. Cl.
*H04Q 7/20* (2006.01)
*H04M 11/04* (2006.01)

(52) U.S. Cl. .............................. 455/456.1; 455/456.2; 455/456.3; 455/466; 455/404.2

(58) Field of Classification Search .. 455/456.1–456.6, 455/404.2, 3.05, 41.2, 433, 440, 466, 457, 455/517, 561, 550.1, 556.2; 713/153, 178–181, 713/400–401, 500–503; 370/400–408; 340/530.1–539.17, 340/989–994; 701/207–208, 213–214, 216, 701/300–302; 709/211–213, 220–221, 232; 342/356, 450–451, 357.01, 357.02, 357.03
See application file for complete search history.

(56) References Cited

U.S. PATENT DOCUMENTS 5,475,717 A * 12/1995 Cordonnier et al. ........ 375/356

(Continued)

OTHER PUBLICATIONS

International Search report for International Application No. PCT/US01/25381, International Filing Date: Aug. 5, 2001.

*Primary Examiner*—Meless Zewdu
(74) *Attorney, Agent, or Firm*—Sterne, Kessler, Goldstein & Fox P.L.L.C.

(57) ABSTRACT

An asset positioning method and system (700) rapidly and accurately determine the special location of wireless nodes distributed in three-dimensional space. Furthermore, as a by-product, every node also determines the relative offset and drift of every other node's clock, so that it is possible for all nodes to carry out a precise synchronized action (708). The positioning and synchronization protocol has significant implications for a broad range of wireless networking infrastructure and applications. For instance, the rapid availability of accurate location information greatly simplifies and optimises the implementation of ad-hoc networks and sensor-based applications (716). Additionally, the synchronized node operations facilitate the development of new applications, such as phase-locked arrays, in which several low power transmitters coordinate to form a powerful group transmitter. Since the positioning protocol yields rapid responses and positional accuracy in the range of a few centimeters, the positioning protocol permits mobile nodes to be tracked while they are moving.

14 Claims, 14 Drawing Sheets

U.S. PATENT DOCUMENTS

| | | |
|---|---|---|
| 5,600,706 A | 2/1997 | Dunn et al. |
| 6,011,974 A | 1/2000 | Cedervall et al. |
| 6,125,368 A * | 9/2000 | Bridge et al. ............... 707/201 |
| 6,157,957 A * | 12/2000 | Berthaud .................... 709/248 |
| 6,169,497 B1 * | 1/2001 | Robert ....................... 340/988 |
| 6,281,834 B1 * | 8/2001 | Stilp .......................... 342/174 |
| 6,539,393 B1 * | 3/2003 | Kabala ....................... 707/102 |
| 6,587,691 B1 * | 7/2003 | Granstam et al. ........ 455/456.1 |
| 6,957,075 B1 * | 10/2005 | Iverson .................... 455/456.3 |

* cited by examiner

METHOD, SYSTEM AND COMPUTER PROGRAM PRODUCT FOR POSITIONING AND SYNCHRONIZING WIRELESS COMMUNICATIONS NODES

BACKGROUND OF THE INVENTION

1. Field of the Invention

The present invention relates generally to asset tracking. More specifically, the present invention pertains to determining the location of objects in a distributed communications network.

2. Related Art

The development of an efficient lightweight protocol to determine the topology of a wireless network of mobile hosts has proven to be elusive. Several conventional solutions have been explored, but each has serious limitations. Table 1 below provides a summary of these conventional approaches.

TABLE 1

Positioning Technologies

| Method | Advantages | Disadvantages | Range |
|---|---|---|---|
| GPS | Covert; Absolute Position; Accurate timing reference | Not a sensor; Coverage area; Power Consumption | Range: Unlimited Accuracy: meters Hardware: Lots |
| INS | Covert; Absolute Position | Not a sensor; Limited Acceleration; Drift rate inaccuracy with time | Range: Unlimited; Accuracy: n/a Hardware: Lots |
| Seismic (range) | Existing Sensor; Timing accuracy easily achieved; Calibration of the sensor | Generating the source signal; Unknown speed of propagation | Range: Limited Accuracy: meters Hardware: Source generator |
| Acoustic (range) | Existing Sensor; Timing accuracy easily achieve; Calibration of the sensor | Not Covert; Generating the source signal; Speed in the medium | Range: Limited Accuracy: meters Hardware: Source generator |
| Ultrasonic (range) | Add sonar capability to nodes; Timing accuracy easily achieved | New Sensor Line-of-sight only Limited range | Range: Very limited Accuracy: sub-meter Hardware: Transducers and Lens |
| Infrared (range) | Existing Sensor | Line-of-sight only; Generating the source signal; Timing accuracy | Range: Limited Accuracy: meters Hardware: Source generator, High speed accurate timing |
| Visual | Capture of target image | Comms bandwidth; Automated processing; Node roof real-estate | Range: Unlimited Accuracy: 10's meters Hardware: Camera, fish-eye lens |
| Radio (range) | Existing asset Measurement range matches comms range | Timing accuracy | Range: Good Accuracy: meters Hardware: High speed accurate timing |
| Radio (range estimate from power measurement) | Existing asset | Accuracy limited by propagation model; Heavily affected by multipath | Range: Limited Accuracy: poor Hardware: Exists |
| Radio (angle) | Simplified array position location calculation | Multiple antennas; Heavily affected by multipath | Range: Good Accuracy: Not Good Hardware: Multiple antennas, phase comparators |
| "Assisted" | Minimal extra hardware; Accuracy largely limited by amount of assistance | Assistance required | Range: Good Accuracy: Good Hardware: minimal |

For example, global satellite positioning (GPS) can be used to determine covert absolute positions. GPS can also provide an absolute timing reference. However, GPS receivers are not sensors and the accuracy measurements fall within the range of meters. An ultrasonic system provides improved accuracy measurements, but is effective over limited ranges. As the information in Table 1 shows, there is a need for a method and system that overcome the above limitations of conventional positioning technology.

SUMMARY OF THE INVENTION

The present invention solves the above problems by providing methodologies and techniques for determining the precise location (e.g., within a few centimeters) of a collection of nodes within three-dimensional space. In addition, the present invention also determines the clock attributes (including drift and offset) relative to neighboring nodes. The present invention can be divided into three distinct phases with each phase having one or more communication cycles. Each cycle communication carries out the exchange of information among the nodes according to the protocol defined in this invention.

The three phases include a measurement phase, information exchange phase, and computation phase. The measurement phase consists of one or more measurement cycles. In each cycle, each node transmits a measurement message containing its identifier and a transmit timestamp for the message. Upon receipt of a measurement message from another node, each node also records the receive timestamp of the measurement messages transmitted by other nodes.

The information exchange phase consists of one or more information exchange cycles. In each cycle, each node transmits a measurement message containing its receive timestamp for messages transmitted by the other nodes during the measurement phase.

Finally, during the computation phase, each node computes the spatial location and clock attributes of the other nodes relative to itself. The present invention also includes protocols that govern the exchange of measurement messages, the generation of send and receive timestamps, the dissemination of the timestamps to all neighboring nodes, and the calculation of their spatial locations and clock attributes.

BRIEF DESCRIPTION OF THE DRAWINGS/FIGURES

The accompanying drawings, which are incorporated herein and form part of the specification, illustrate the present invention and, together with the description, farther serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

I. Introduction

The present invention includes a method, system, and computer program product for enabling a wireless communications node to determine accurately and precisely the spatial locations of neighboring communications nodes distributed in three-dimensional space. Additionally, the present invention includes methodologies and techniques for determining the clock characteristics, including the relative offset and drift of the neighboring nodes. As a result, each node is permitted to execute precise synchronized actions.

The present invention has significant implications for a broad range of wireless networking infrastructure and applications. The rapid availability of accurate location information can greatly simplify and optimize the implementation of ad-hoc networks and/or sensor-based applications. One exemplary application domain benefiting from the present invention includes vehicle position sensors (e.g., for "smart" highways or for collision detection in adverse conditions). Another example is a tourist information system in which a tourist is given relevant information for the location of the tourist.

In addition, the expected level of accuracy of the distance measurement obtained by the present invention in combination with its lightweight distributed clock synchronization algorithm allow the creation of entirely new applications. Such new applications include phase locked arrays, in which several low power transmitters create a powerful group transmission through careful control of the superposition of several low power signals.

Since the present invention is configured to rapidly locate nodes with positional accuracy in the range of a few centimeters, the present invention can be used to track mobile nodes while they are moving. Moreover, the present invention is highly scalable to position and/or synchronize thousands of wireless nodes.

II. System Overview

Figure 1:
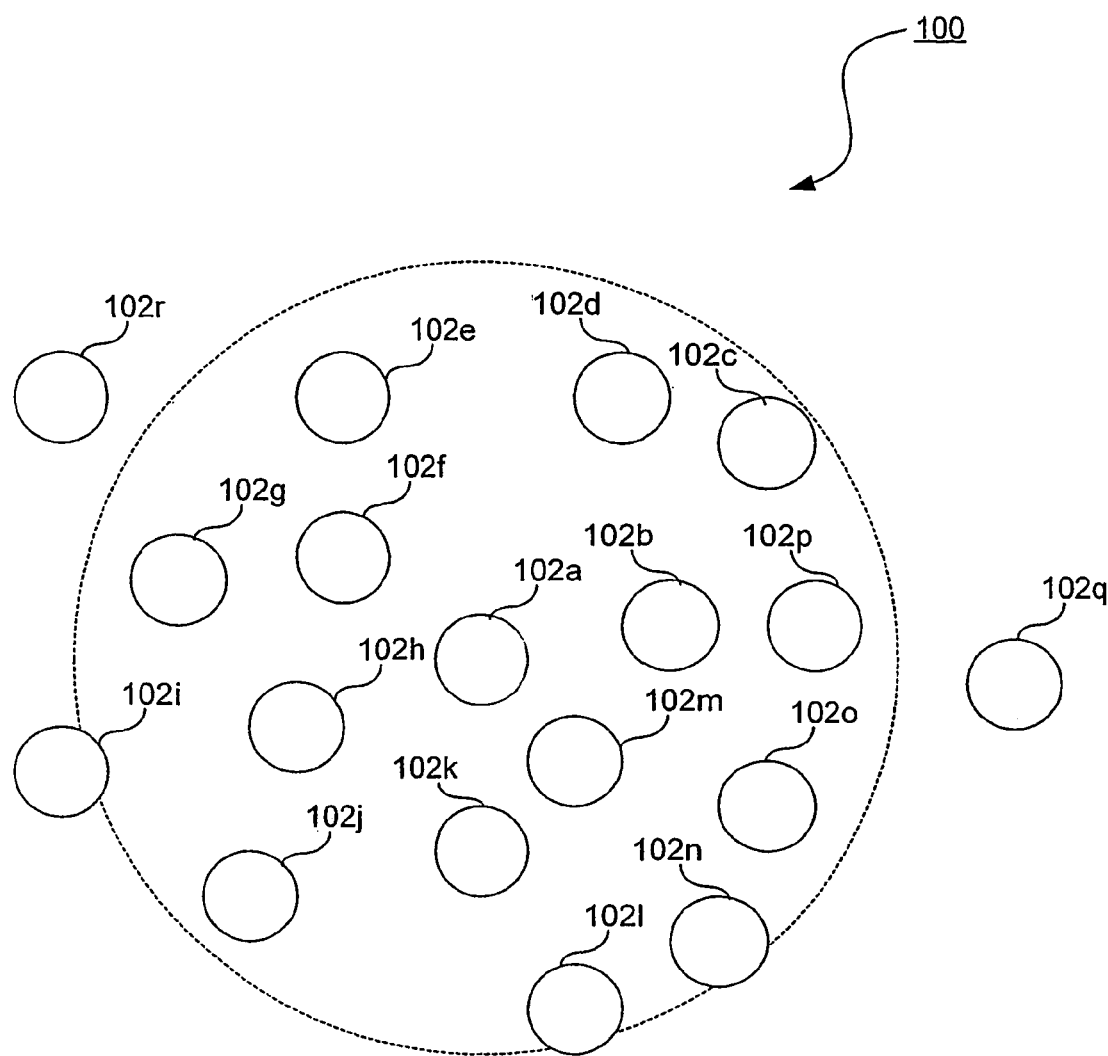
FIG. 1 illustrates a wireless multinodal communications system according to an embodiment of the present invention.

FIG. 1 illustrates an embodiment of a wireless multinodal communications system 100 of the present invention. System 100 includes a widely distributed network of wireless communications nodes 102a–102n (collectively referred to herein as "communications nodes 102"). As discussed above, system 100 can be implemented in a variety of mobile and/or non-mobile wireless networks, including sensor-based applications. Additionally, communications nodes 102 are positioned in three-dimensional space.

The present invention can be implemented in a system having a centralized communications node 102. However, in the preferred embodiment, no centralized node or node with any special privileges is required. Accordingly, the present invention operates in any environment consisting of a collection of communications nodes 102. As such, the positioning and/or synchronization methodologies and techniques of the present invention can be initiated or executed by any one of the communication nodes 102.

The initiating or executing node is referred to as the base node. Referring to FIG. 1, the base node is communications node 102a (referred to herein as "base node 102a"). The nodes located within the listening range of base node 102a are referred to as the neighboring nodes. The neighboring nodes in FIG. 1 are denoted as communications nodes 102b–102p. Communications nodes 102q–102r lie outside of the range of base node 102a.

Figure 2:
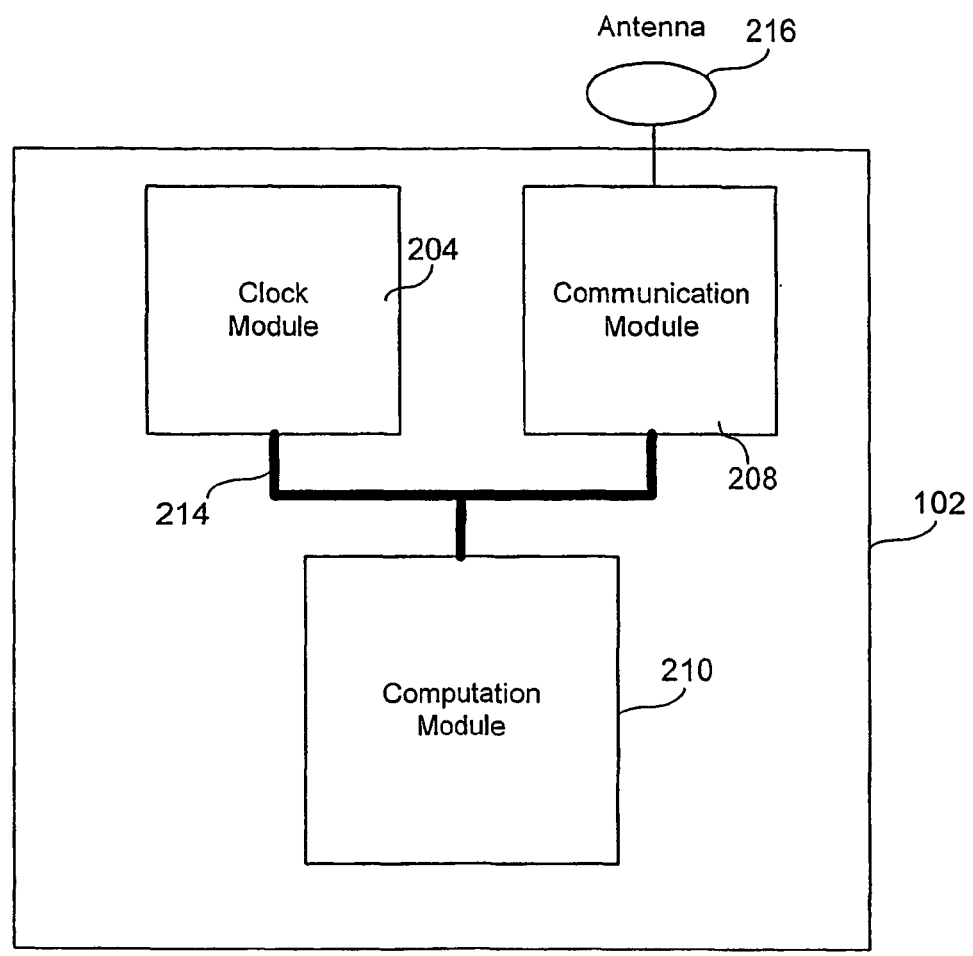
FIG. 2 illustrates a communications node according to an embodiment of the present invention.

FIG. 2 shows the architecture of communications node 102 according to an embodiment of the present invention. Communications node 102 includes a clock module 204, communication module 208, antenna 216, and computation module 210. The components of communications node 102 are connected by a bus 214. Bus 214 is a conventional, bidirectional bus.

Clock module 204 includes a time-of-day clock, as described in detail below. Clock module 204 is linked to communication module 208 which receives and transmits signals through antenna 216. As discussed below, communication module 208 consists of several send and receive buffers for storing the signals. Clock module 204 and communication module 208 are linked to permit the receive and/or transmit times of the signals to be timestamped and/or recorded. The transmit time of a signal is the value of the time-of-day clock of the transmitting communications node 102 when a specified bit (e.g., the last bit of the message sync header) is transmitted. The specified bit is referred to herein as the "sync bit" of the signal. The receive time of a signal is the value of the time-of-day clock of the receiving communications node 102 at the arrival of the sync bit.

Computation module 210 consists of a general-purpose computation and storage engine. Computation module 210 manages clock module 204 and communication module 208, and executes other operations as described in detailed below. Computation module 210 constructs the information (e.g., send messages) residing in the send buffers of communication module 208. Computation module 210 also instructs clock module 204 to send a timing signal to communication module 208 to initiate the sending operations. Computation module 210 also collects the information residing in the receive buffers of communication module 208.

Antenna 216 sends and receives signals (including electronic, electromagnetic, optical, or the like). In an embodiment, antenna 216 is a UHF antenna operating in half-duplex mode at, for example, 10 Mbs data rate, 2.4 GHz carrier, and turnaround time of a microsecond. However, it should be understood that the present invention operates in other regions of the frequency spectrum, including without limitation in the radio, microwave, and infrared spectrum, as would be apparent to one skilled in the relevant art(s).

Figure 3:
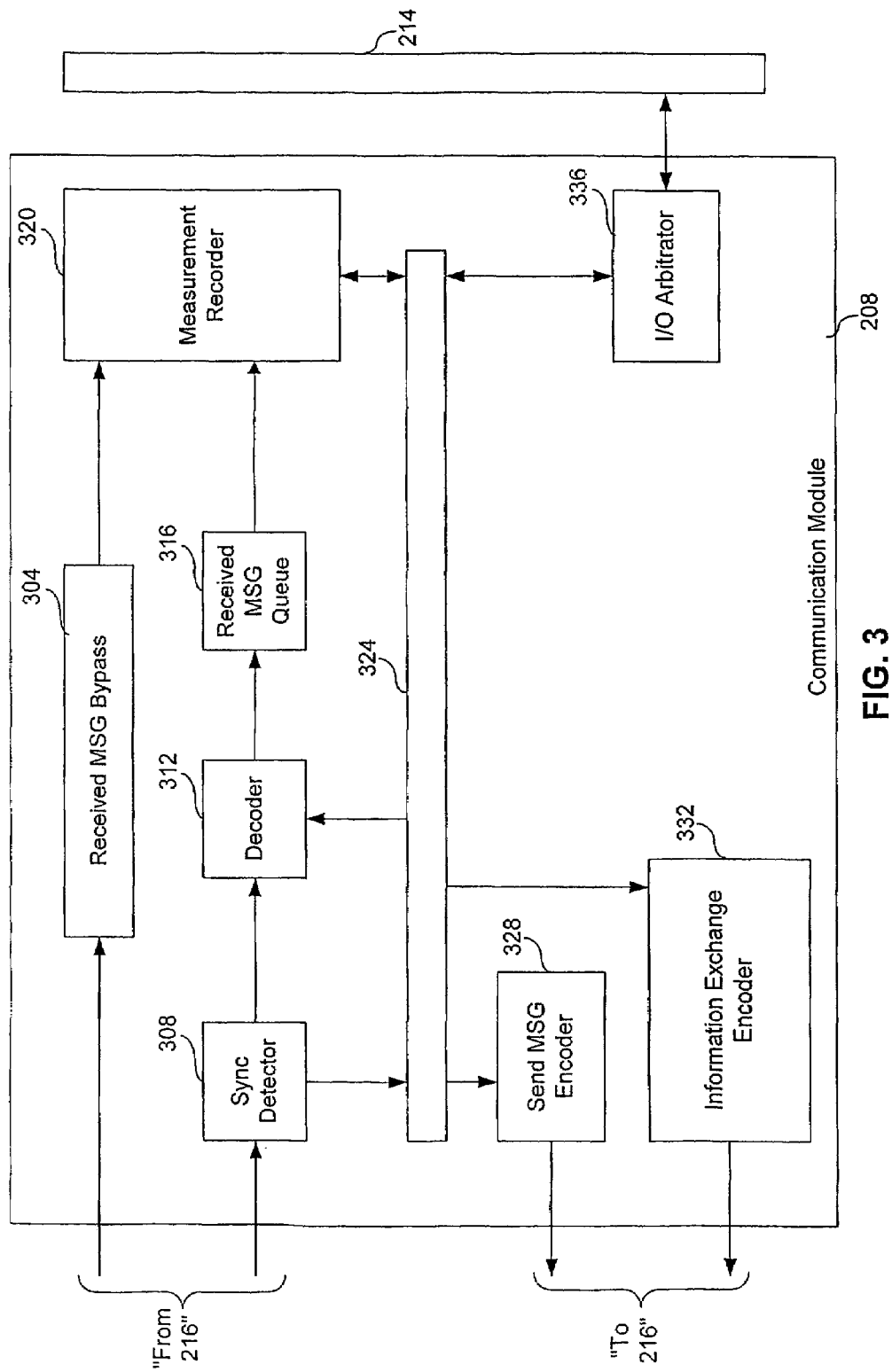
FIG. 3 illustrates a communication module according to an embodiment of the present invention.

FIG. 3 shows the components of communication module 208 according to an embodiment of the present invention. Sync detector 308 receives signals from antenna 216 and forwards the signals to decoder 312. Upon recognizing the synch bit of the received signal, sync detector 308 sends a timestamp trigger pulse to clock module 204 (shown in FIG. 2). Thus, in an embodiment, the timestamp trigger pulse corresponds to the last edge of the last bit of the sync header of the received signal. Decoder 312 decodes the rest of the received signal and stores the signal in received message queue 316.

Received message queue 316 is one of two receive buffers located in communication module 208. The second receive buffer is received message bypass 304. Antenna 216 delivers signals destined for received message bypass 304 directly to the buffer. Measurement recorder 320 receives and stores signals from received message queue 316 and received message bypass 304.

Communication module 208 also includes a send message encoder 328 and an information exchange encoder 332 that send signals to antenna 216 for broadcast to other communications nodes 102. On receiving a control signal (i.e., timing signal from clock module 204), the contents of send message encoder 328 and information exchange encoder 332 are sent out at the prescribed rate of 10 Mbps using a 2.4 GHz carrier.

The components of communication module 208 are interconnected to each other by an internal universal bus 324. An input/output (I/O) arbitrator 336 is also connected to bus 324. I/O arbitrator 336 manages the flow of signals to and from bus 214.

Figure 4:
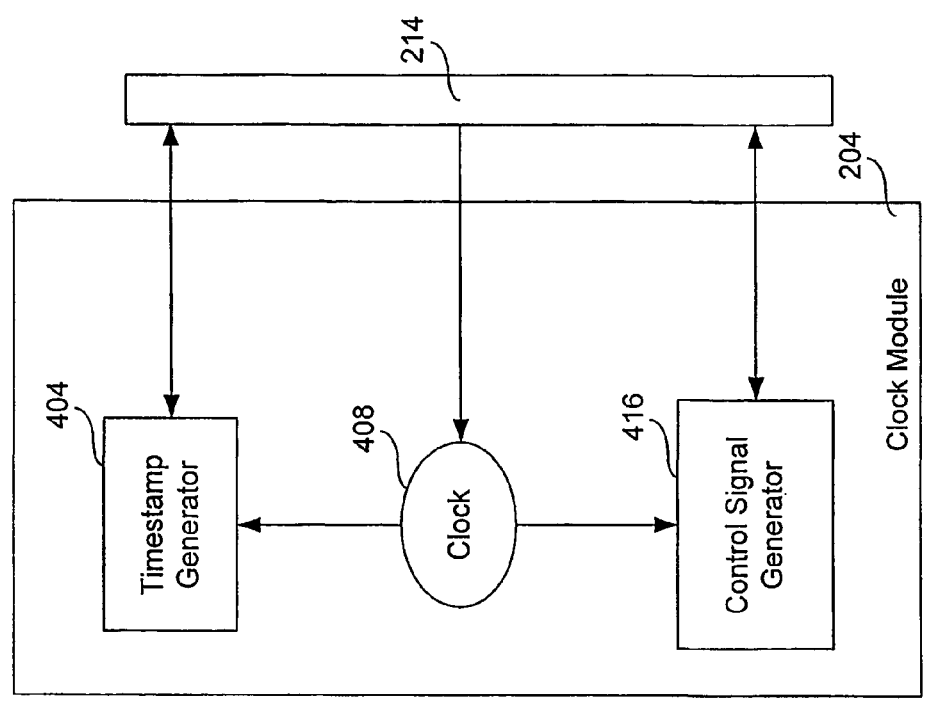
FIG. 4 illustrates a clock module according to an embodiment of the present invention.

FIG. 4 shows the components of clock module 204 according to an embodiment of the present invention. Clock module 204 includes a timestamp generator 404, a clock 408, and a control signal generator 416. Clock 408 is a time-of-day clock of nanosecond resolution. The offset and drift of clock 408 are assumed to be essentially constant over a few seconds. High clock drifts, of the order of 100 parts-per-million (ppm), are acceptable. Thus, the present invention can be implemented with a crystal oscillator clock.

Clock 408 provides signals to timestamp generator 404 and control signal generator 416. Timestamp generator 404 provides receive and transmit timestamps to communication module 208 (shown in FIG. 2). Control signal generator 416 provides signals to instruct send message encoder 328 and information exchange encoder 332 (both shown in FIG. 3) to transmit their respective contents.

Figure 5:
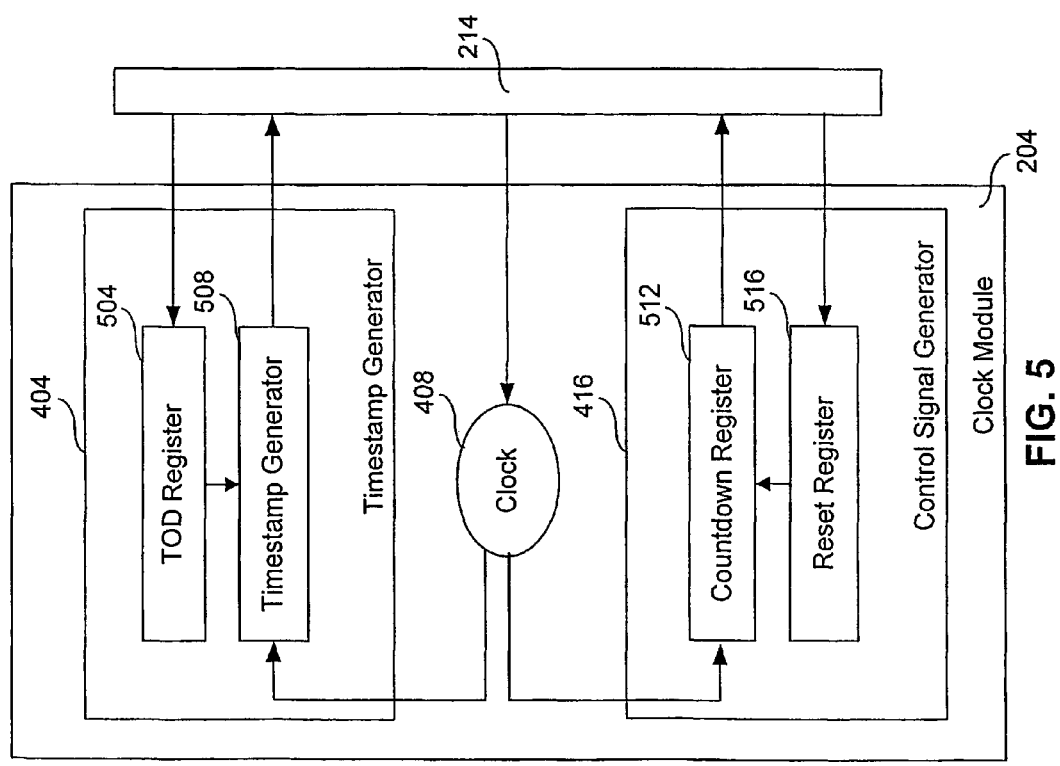
FIG. 5 illustrates a clock module according to another embodiment of the present invention.

FIG. 5 illustrates an alternative embodiment of clock module 204. In this embodiment, timestamp generator 404 includes a time-of-day (TOD) register 504 and a timestamp register 508. Additionally, control signal generator 416 includes a countdown register 512 and a reset register 516. In an embodiment, registers 504, 508, 512 and 516 are 64 bit registers.

With nanosecond resolution, TOD register 504 captures the time of day from clock 408, and continuously records time since the last initialization of the register. Upon receiving an initialization signal, the value of TOD register 504 is reset to zero. TOD register 504 receives a timestamp trigger pulse from communication module 208 (shown in FIG. 2), as discussed below. Upon receipt of the timestamp trigger pulse, the current time value recorded in TOD register 504 is transferred to timestamp register 508. The time value serves as the timestamp for the timestamp trigger pulse.

Timestamp register 508 interacts with bus 214 to transfer out a timestamp signal representing the time value.

Clock 408 also drives countdown register 512. Countdown register 512 receives nanosecond pulses from clock 408 and counts down to generate a timing signal when the count reaches zero. The timing signal is sent to communication module 208 (shown in FIG. 2) to support operations requiring transmit and receive times. After releasing the timing signal, countdown register 512 refreshes its contents with the contents of reset register 516. Accordingly, reset register 516 contains the refresh value for countdown is register 512. The refresh value it provided by computation module 210 (shown in FIG. 2).

Figure 6:
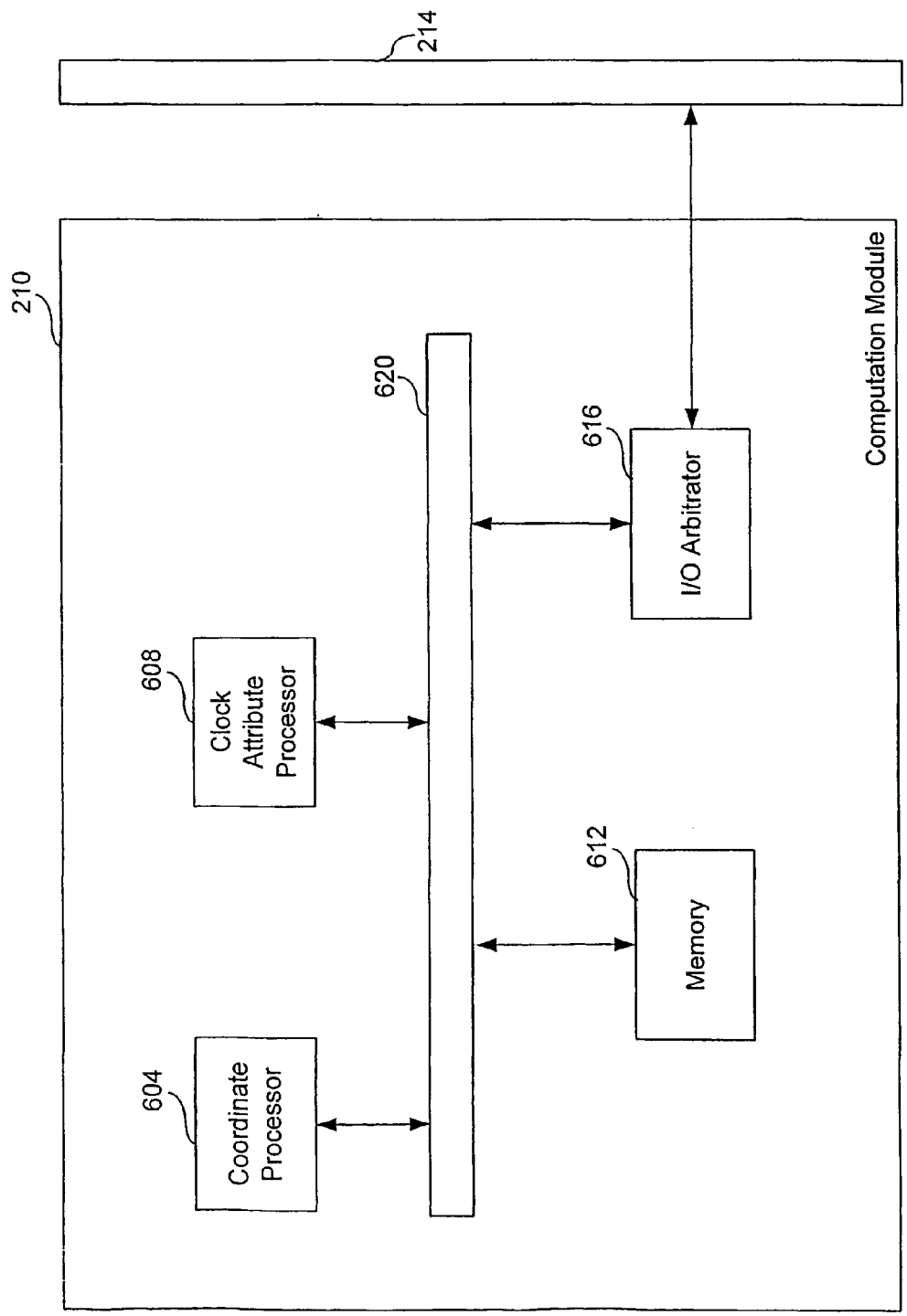
FIG. 6 illustrates a computation module according to an embodiment of the present invention.

FIG. 6 shows the components of computation module 210 according to an embodiment of the present invention. Computation module 210 includes a coordinate processor 604 and a clock attribute processor 608, both of which are connected to an internal universal bus 620. A memory 612 and I/O arbitrator 616 are also connected to bus 620. I/O arbitrator manages the exchange of signals between computation module 210 and bus 214.

III. Operational Flow for Positioning Communications Nodes

Figure 7:
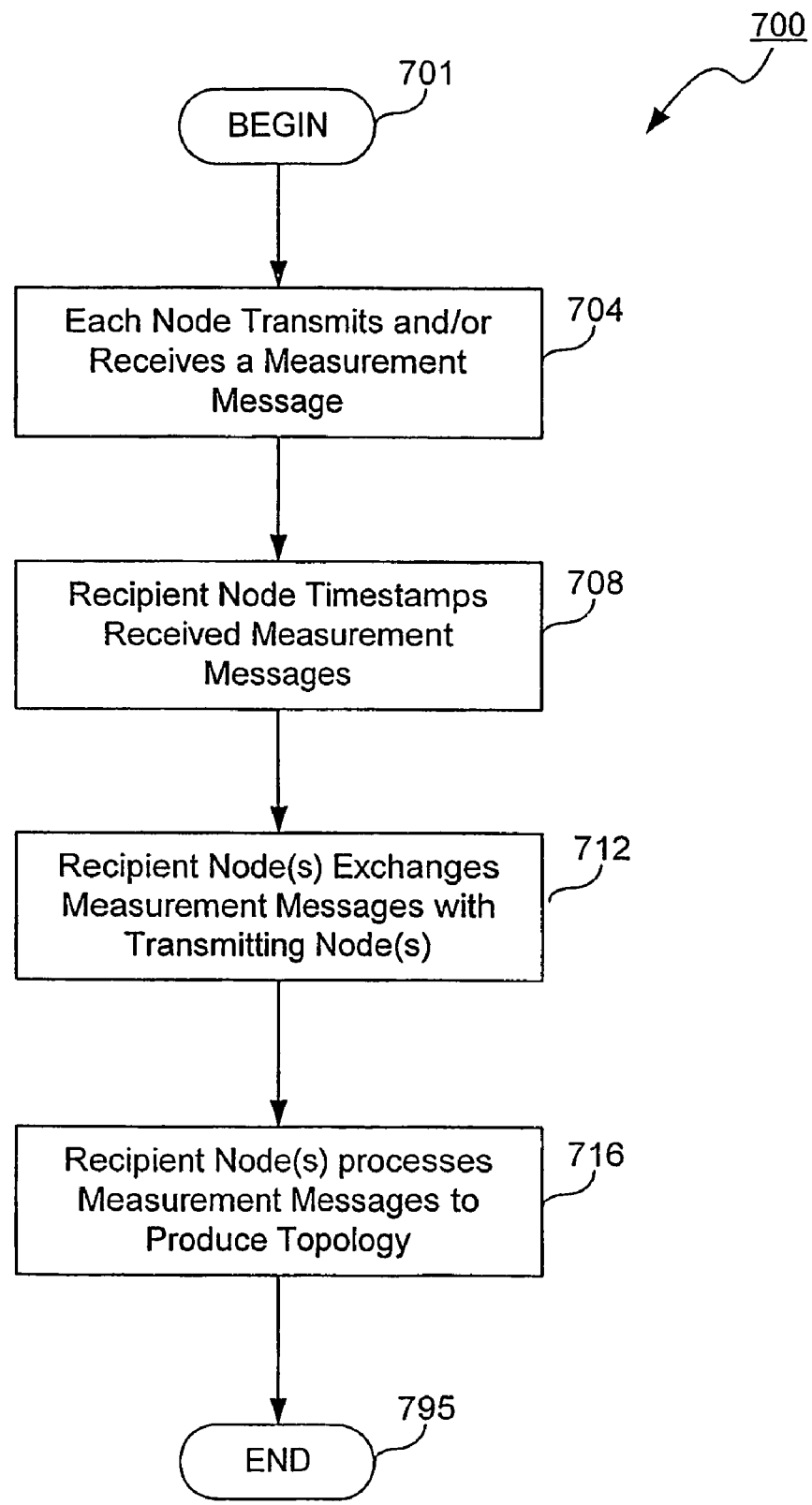
FIG. 7 illustrates an operational flow diagram for positioning wireless communications nodes according to an embodiment of the present invention.

The present invention provides a lightweight, inexpensive and scaleable solution for determining the location and clock attributes of a collection of spatially distributed communications nodes 102. Referring to FIG. 7, flowchart 700 represents the general operational flow of an embodiment of the present invention. More specifically, flowchart 700 shows an example of a control flow for determining the spatial locations of multiple communications nodes 102 described in reference to FIGS. 1–6.

The control flow of flowchart 700 begins at step 701 and passes immediately to step 704. At step 704, base node 102a (shown in FIG. 1) initiates the positioning and synchronization process by exchanging measurement messages with neighboring nodes 102b–102p. In turn, each communications node 102 a synchronously transmits and/or receives a measurement message with its neighboring nodes. As intimated above, computation module 210 (shown in FIG. 2) constructs two types of send messages that are transmitted from communication module 208. One type of send message is a measurement message. A measurement message contains an identifier for the transmitting communications node 102 and a transmit timestamp. The measurement message also includes a header and trailer for synchronization and frame delimiting. Computation module 210 interacts with clock module 204 and communication module 208 to construct the measurement message. Once generated, the measurement message is stored in send message encoder 328 (shown in FIG. 3).

In an embodiment, communications node 102 operates in half duplex mode to exchange measurement messages in TDMA slots. As such from the perspective of base node 102a, each neighboring node 102b–102p is assigned a designated time slot for exchanging signals with base node 102a. In send mode, countdown register 512 (shown in FIG. 5) counts down and sends a timing signal pulse to send message encoder 328 (shown in FIG. 3). The timing signal instructs send message encoder 328 to forward the measurement message stored therein to antenna 216. The timing signal is set to enable antenna 216 to transit the measurement message in the time slot for the designated neighboring node 102b–102p. Computation module 210 (shown in FIG. 2) provides the refresh values to reset register 516 (shown in FIG. 5) so that it can load countdown register 512 to trigger the next transmission in the designated time slot for the next neighboring node 102b–102p.

Prior to forwarding the measurement message to antenna 216, send message encoder 328 (shown in FIG. 3) sends a timestamp trigger pulse to TOD register 504 (shown in FIG. 5). In an embodiment, send message encoder 328 pulses TOD register 504 when the sync bit (e.g., the last bit of the message sync header) is transmitted to antenna 216.

Upon receipt of the timestamp trigger pulse, TOD register 504 pulses timestamp register 508 to generate and forward a timestamp signal to send message encoder 328 (shown in FIG. 3). Send message encoder 328 postpends the timestamp to the measurement message which is forwarded to antenna 216. Antenna 216 transmits the measurement message to the neighboring node 102b–102p for the designated time slot.

When base node 102a is operating in receive mode, antenna 216 (shown in FIG. 2) receives measurement messages transmitted from neighboring nodes 102b–102p from their designated TDMA slot. Referring back to FIG. 7 at step 708, base node 102a timestamps the received measurement messages. Sync detector 308 (shown as FIG. 3) receives the measurement message from antenna 216. As sync detector 308 detects the sync bit, sync detector 308 pulses TOD register 504 (shown in FIG. 5) and, in response, timestamp register 508 returns a timestamp signal indicating the receive timestamp to decoder 312 (shown in FIG. 3). Decoder 312 decodes the rest of the received measurement message which contains the transmitting node 102 identifier and transmit timestamp. Decoder 312 also receives the timestamp signal from timestamp register 508, and postpends the receive timestamp to the measurement message.

Afterwards, the measurement message is stored in measurement recorder 320. All measurement messages received from the neighboring nodes 102b–102p are stored in measurement recorder 320. Measurement recorder 320 produces a table of measurement messages containing the transmitting node 102 identifier, transmit timestamp and receive timestamp.

Referring again to FIG. 7 at step 712, the measurement messages from the neighboring nodes 102b–102p are forwarded from measurement recorder 320 (shown in FIG. 3) to information exchange encoder 332. Computation module 210 (shown in FIG. 2) sends a signal to reset register 516 (FIG. 5) to refresh countdown register 512. When countdown register 512 counts down to zero, countdown register 512 sends a timing signal to information exchange encoder 332. Upon receipt of the timing signal, information exchange encoder 332 interacts with antenna 216 to broadcast the measurement messages to the designated neighboring nodes 102b–102p.

At step 716 in FIG. 7, the recipient communications nodes 102 receives and processes the measurement messages transmitted in step 712 Referring back to FIG. 3, received message bypass 304 collects the measurement messages from antenna 216 and stores them in measurement recorder 320. Computation module 210 processes the measurement messages to determine the spatial coordinates of the neighboring nodes. As a result, each communications node 102, serving as base node 102a, is able to determine the topology of the widely distributed communications nodes 102 within its network. After the topology has been determined, the control flow of flowchart 700 ends as indicated by step 795.

Hence, the present invention includes methodologies and techniques that govern the exchange of measurement messages, the generation of send and receive timestamps, the dissemination of the timestamps to all neighboring nodes, and the calculation of their spatial locations. The present invention can be divided into three phases with each phase having one or more communication cycles. A cycle is divided into time slots which are allocated among communications nodes 102.

The three phases include a measurement phase, information exchange phase and computation phase. The measurement phase (described in reference to steps 704–708 in FIG. 7) consists of one or more measurement cycles. In each cycle, each communications node 102 transmits in a designated time slot a measurement message containing its identifier and the transmit timestamp of the message. The communications node 102 also records the receive timestamp of the measurement messages sent by other communications nodes 102.

The information exchange phase (described in reference to step 712 in FIG. 7) consists of one or more information exchange cycles. In each cycle, each communications node 102 transmits a measurement message containing its receive timestamp for messages transmitted by other communications nodes 102 during the measurement phase.

Finally, during the computation phase (described in reference to step 716 in FIG. 7), each communications node 102 computes the spatial coordinates of the other communications nodes 102. After the information exchange phase, each communication node 102 has, for every ordered pair of nodes, two pairs of transmit and receive timestamps. This information is used to determine the topology. In an embodiment, no communication takes place during this phase.

Figure 8:
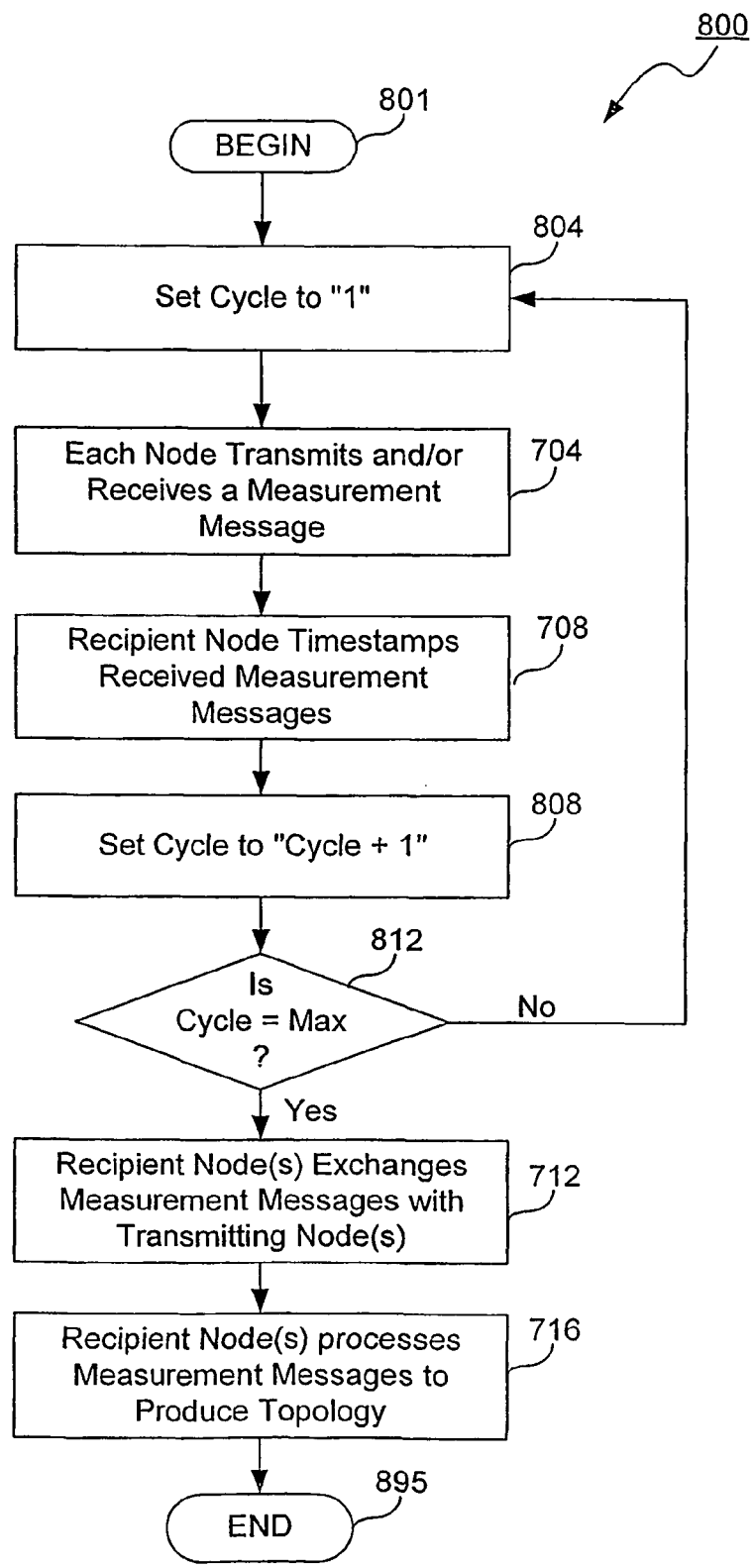
FIG. 8 illustrates an operational flow diagram for positioning wireless communications nodes according to a second embodiment of the present invention.

As described, the measurement phase consists of multiple cycles in an embodiment. Referring to FIG. 8, flowchart 800 represents the general operational flow of an embodiment of the present invention having multiple measurement cycles. More specifically, flowchart 800 shows an example of a control flow for determining the spatial locations of multiple communications nodes 102 using multiple measurement cycles.

The control flow of flowchart 800 begins at step 801 and passes immediately to step 804. At step 804, an initialization parameter is set to specify the cycle count as one. At steps 704–708, the measurement phase is executed as described in reference to FIG. 7. At step 808, the cycle count is incremented by one count. At step 812, computation module 210 (shown in FIG. 2) compares the cycle count to the maximum count parameter. The maximum count parameter determines the number of measurement cycles for the measurement phase. The maximum count parameter is set to optimize the accuracy of the spatial calculations.

Figure 9:
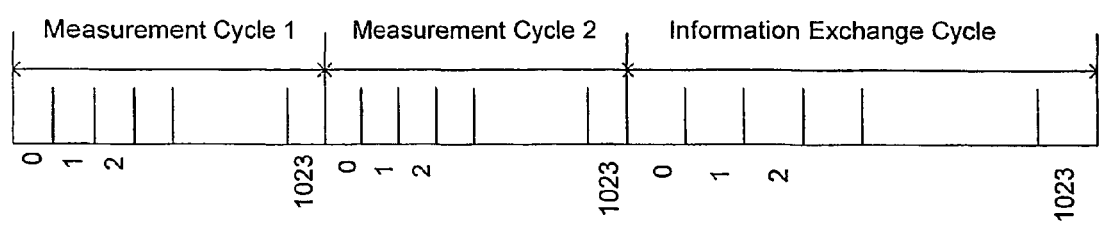
FIG. 9 illustrates a timing diagram for positioning wireless communications nodes according to an embodiment of the present invention.

In an embodiment, the measurement cycle is set for two. FIG. 9 illustrates a timing diagram for transmitting measurement messages over two measurement cycles. Each cycle is divided into 1,024 slots to support asynchronous communications with as many as 1,024 communications nodes 102. Each communications node 102 is allocated a designate slot(s) for transmitting and/or receiving measurement messages.

Referring back to FIG. 8, if at step 812 computation module 210 determines that the designated maximum number of cycles has not been reached, the control flow returns to step 804 and another measurement cycle is executed as shown in FIG. 9. If, however, it is determined that the maximum number of cycles has been executed, the control flow passes to step 712. As described above, at step 712, the information exchange phase is executed as shown in FIG. 9. It should be noted that the time slots should be large enough to accommodate the message size and clock drifts. In an embodiment, each measurement cycle slot is ten microseconds and each information exchange slot is ten milliseconds.

Referring again to FIG. 8, at step 716, the computation phase is executed to determine the positions of the communications nodes 102 with respect to each other. After the topology has been determined, the control flow of flowchart 800 ends as indicated by step 895.

Figure 10:
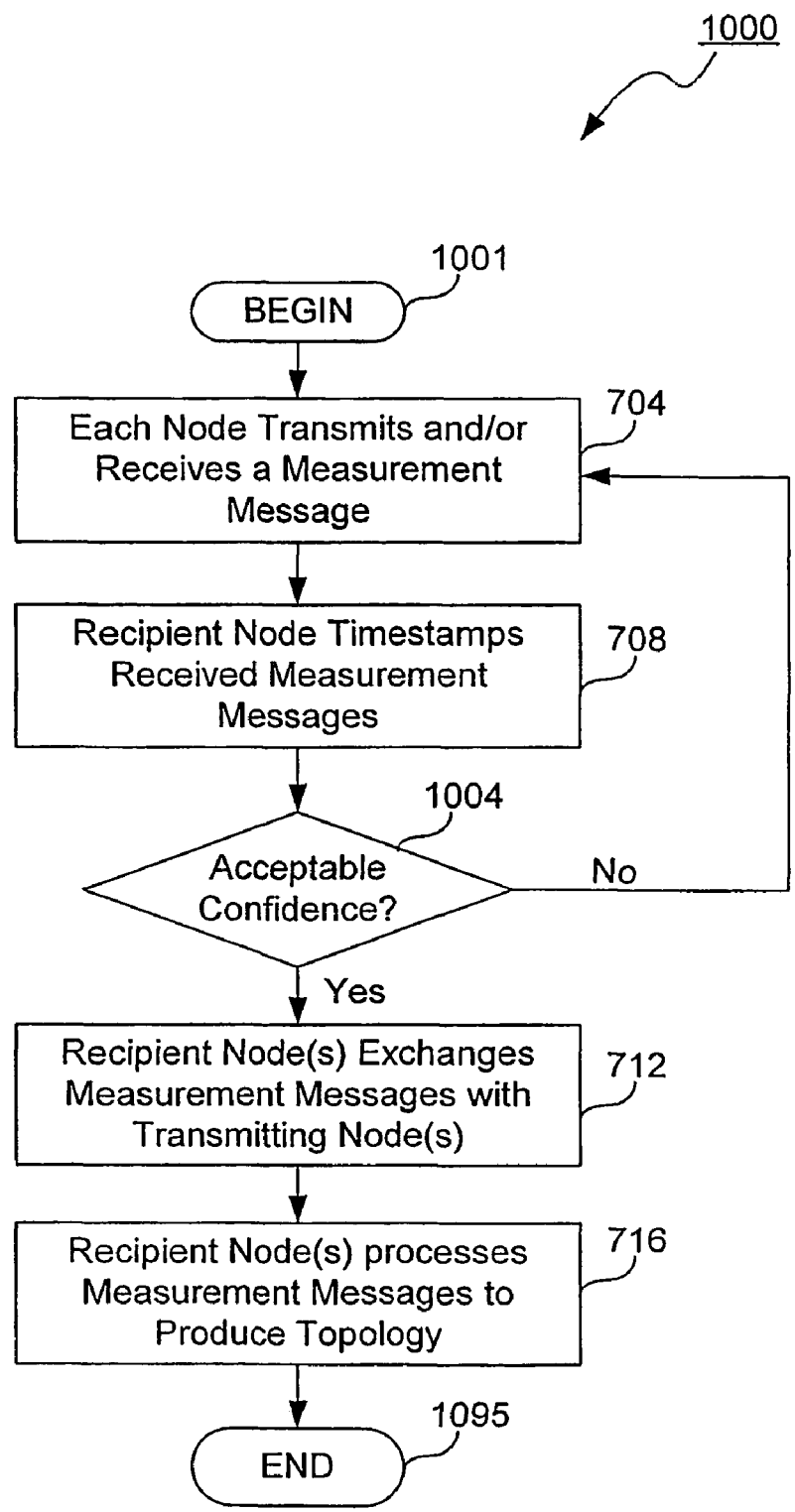
FIG. 10 illustrates an operational flow diagram for positioning wireless communications nodes according to a third embodiment of the present invention.

As discussed, upon completion of the information exchange phase, each communications node 102 should have sufficient information to compute the spatial coordinates of every other communications node 102. Each communications node 102 should also have sufficient information to reduce errors. Referring to FIG. 10, flowchart 1000 represents the general operational flow of an embodiment of the present invention for mitigating computation errors. More specifically, flowchart 1000 shows another example of a control flow for determining the spatial locations of multiple communications nodes 102.

The control flow of flowchart 1000 begins at step 1001 and passes immediately to steps 704–708 as described in reference to FIG. 7. At step 1004, computation module 210 determines whether sufficient information has been collected to confirm the accuracy of the measurements. If network conditions (e.g., noise, collision, invalid checksum, etc.) adversely affects the quality of communications among communications nodes 102, the entire measurement phase is repeated, or another measurement cycle is executed. Specifically, during the measurement phase, whenever computation module 210 detects a corrupted cycle, computation module 210 starts another measurement cycle until, for example, two successive uncorrupted measurement cycles occur. Computation module 210 could also decide to not execute another measurement cycle if it determines that enough information is available. In an embodiment, computation module 210 determines that it has enough information if there are two successive corrupted cycles that contain enough measurements to compute topology within desired accuracy. In an embodiment, computation module 210 determines that it has enough information if there are two measurement cycles that are not successive but are close enough for the clock constant drift assumption.

If computation module 210 determines the measurements provide acceptable levels of confidence, the control flow passes to steps 712–716 to execute the information exchange and computation phases as described in reference to FIG. 7. Afterwards, the control flow of flowchart 1000 ends as indicated by step 1095.

In an embodiment, the accuracy determinations are also evaluated at the end of the information exchange phase in addition to, or in lieu of, the measurement phase determinations. As such, in the information exchange phase, whenever computation module 210 detects a corrupted cycle it starts another information exchange cycle until it determines that enough information has been conveyed to compute the topology within desired accuracy.

Figure 11:
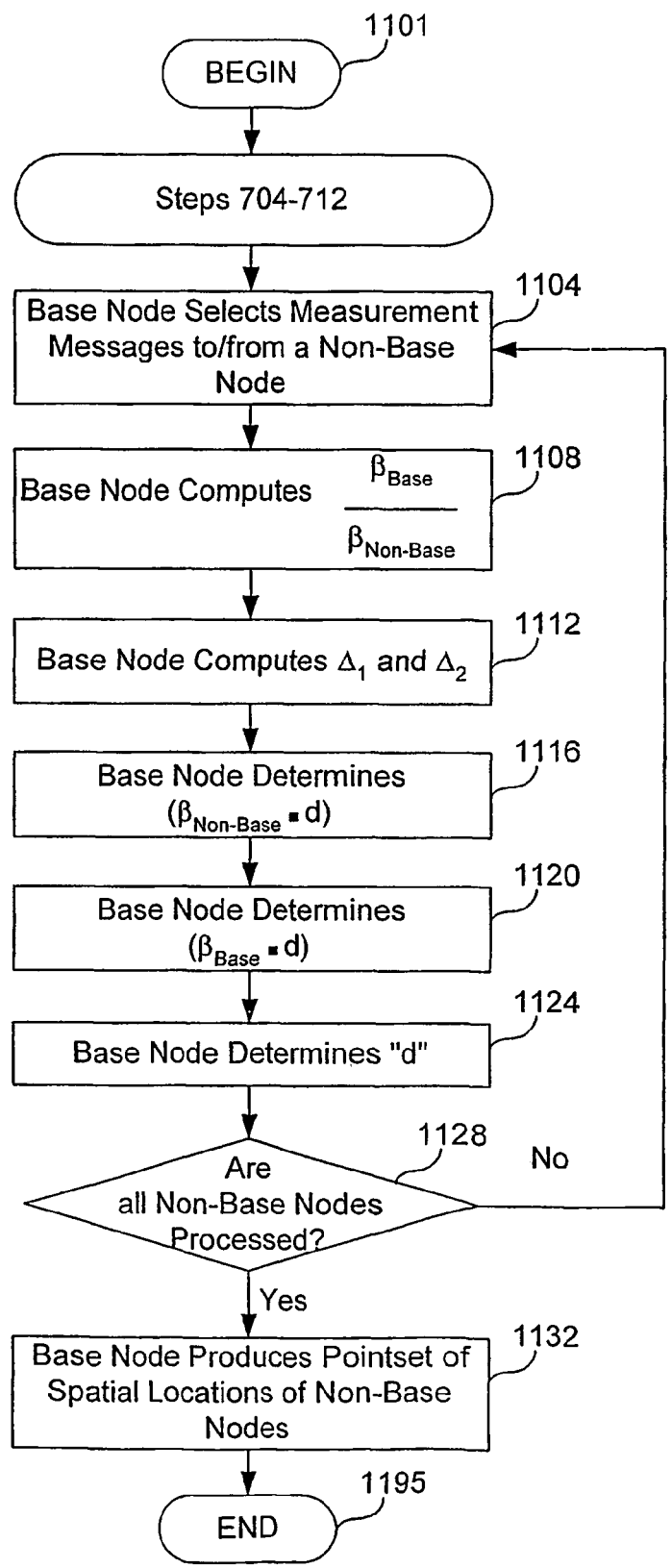
FIG. 11 illustrates an operational flow diagram for computing the spatial coordinates of wireless communications nodes according to an embodiment of the present invention.

The present invention can be used to rapidly compute the precise location of communications nodes 102 within the listening range of base node 102b. Referring to FIG. 11, flowchart 1100 represents the general operational flow of an embodiment of the present invention for executing the computation phase. More specifically, flowchart 1100 shows another example of a control flow for determining the spatial locations of multiple communications nodes 102. In particular, flowchart 1100 shows an alternative embodiment of step 716 of FIG. 7.

The control flow of flowchart 1100 begins at step 1101 and passes immediately to steps 704–712 to execute the measurement and information exchange phases as described in reference to FIG. 7. At step 1104, the computation phase is initiated when coordinate processor 604 (shown in FIG. 6) selects the measurement messages stored in measurement recorder 320 (shown in FIG. 3) from neighboring nodes 102b—102b.

At step 1108, coordinate processor 604 computes the ratio $$\frac{\beta_a}{\beta_b},$$

where $\beta_a$ (also referred to herein as "$\beta_{base}$") is the drift rate for base node 102a and $\beta_b$ (also referred to herein as "$\beta_{nonbase}$") is the drift rate for neighboring node 102b–102p.

For example, assume that system 100 includes only two communications nodes 102, A and B, both operating in each other's respective listening range. For global time t, their local clocks 408, which may have some drift and offset, have clock readings, respectively, of:

$$\tau_a(t) = \beta_a(\alpha_a + t)$$

$$\tau_b(t) = \beta_b(\alpha_b + t) \qquad \text{Equation 1}$$

The present invention uses the time equivalent of the internodal distance "d" between the communications nodes 102. In other words, the internodal distance "d" is represented in nanoseconds to indicate the time it will take light to travel that distance. It is presumed that for the environments for which the present invention is implemented, the speed of light does not vary significantly making this measure of distance stable.

Time generated from local clock 408 is denoted with the $\tau$ notation, while global clock time is denoted with a "t" type notation. Also, when discussing local clock times, the letter contained in the subscript on $\tau$ indicates the clock which records the time, so for example $\tau_{a1}$ is a time recorded by local clock 408 at communications node A (i.e., base node 102a).

Accordingly, at time $t_1$, communications node A broadcasts a measurement message in the form of a tuple giving its identifier and a transmit timestamp, the latter denoted by $\tau_{a1}$. That is, the timestamp reads:

$$\tau_{a1} = \tau_a(t_1) = \beta_a(\alpha_a + t_1) \qquad \text{Equation 2}$$

and the tuple broadcast is $(A, \tau_{a1})$. Communications node B receives the tuple and records the time of receipt as $\tau_{b1}$. Denoting the time distance between communications node A and communications node B as d, the global time at which communications node B should receive the broadcast from communications node A is $t_1 + d$, so that $$\tau_{b1} = \beta_b(\alpha_b + t_1 + d) \qquad \text{Equation 3}$$

Since each node is running the same decentralized protocol, communication node B also sends a two-tuple at global time $t_2$. In steps similar to above, communications node B broadcasts the tuple $(B, \tau_{b2})$, where $$\tau_{b2} = \tau_b(t_2) = \beta_b(\alpha_b + t_2) \qquad \text{Equation 4}$$

and communications node A receives this broadcast at global time $t_2 + d$, which communications node A marks as time $$\tau_{a2} = \tau_a(t_2 + d) = \beta_a(\alpha_a + t_2 + d) \qquad \text{Equation 5}$$

In an embodiment, once the first cycle of messages has been completed, communications nodes A and B, both, send a second measurement cycle, with communications node A sending its second message at time $t_3$, and communications node B sending its message at time $t_4$. Using notation similar to above, the timestamps generated by communications nodes A and B is represented by:

$$\tau_{a3} = \beta_a(\alpha_a + t_3),$$

$$\tau_{b3} = \beta_b(\alpha_b + t_3 + d),$$

$$\tau_{b4} = \beta_a(\alpha_a + t_4 + d), \text{ and}$$

$$\tau_{b4} = \beta_b(\alpha_b + t_4).$$

Upon completion of the measurement phase, all eight of the measurement messages timestamps can be expressed as:

$$\tau_{a1} = \beta_a(\alpha_a + t_1) \qquad \tau_{b1} = \beta_b(\alpha_b + t_1 + d)$$

$$\tau_{a2} = \beta_a(\alpha_a + t_2 + d) \qquad \tau_{b2} = \beta_b(\alpha_b + t_2)$$

$$\tau_{a3} = \beta_a(\alpha_a + t_3) \qquad \tau_{b3} = \beta_b(\alpha_b + t_3 + d)$$

$$\tau_{a4} = \beta_a(\alpha_a + t_4 + d) \qquad \tau_{b4} = \beta_b(\alpha_b + t_4)$$

The above eight expressions are referred to herein as "reference equations." During the information exchange phase, communications node A sends the values $\tau_{a2}$ and $\tau_{a4}$ to communications node B, and communications node B sends the values $\tau_{b1}$ and $\tau_{b3}$ to communications node A. At this point, both of communications nodes A and B have all eight values $\tau_{a1}, \tau_{a2}, \tau_{a3}, \tau_{a4}, \tau_{b1}, \tau_{b2}, \tau_{b3}$, and $\tau_{b4}$.

Accordingly at step 1104, both communications nodes A and B use these eight values to compute the ratios $$\frac{\beta_a}{\beta_b}$$

from the following equation:

$$\frac{\tau_{a3} - \tau_{a1}}{\tau_{b3} - \tau_{b1}} = \frac{\beta_a(\alpha_a + t_3) - \beta_a(\alpha_a + t_1)}{\beta_b(\alpha_b + t_3 + d) - \beta_b(\alpha_b + t_1 + d)} = \frac{\beta_a}{\beta_b} \qquad \text{Equation 6}$$

Next at step 1112, coordinate processor 604 computes the quantities $\Delta_1$ and $\Delta_2$ from:

$$\Delta_1 = \tau_{b1} - \tau_{a1} = \beta_b(\alpha_b + t_1 + d) - \beta_a(\alpha_a + t_1) \qquad \text{Equation 6}$$

and $$\Delta_2 = \tau_{a2} - \tau_{b2} = \beta_a(\alpha_a + t_2 + d) - \beta_b(\alpha_b + t_2) \qquad \text{Equation 7}$$

At step 1116, coordinate processor 604 computes the quantity $\beta_b d$ from the equation:

$$\beta_b d = \frac{\Delta_1 + \Delta_2}{2} + \frac{1}{2}\left(\frac{\beta_b}{\beta_a} - 1\right)(\tau_{a2} - \tau_{a1}) \qquad \text{Equation 8}$$

As can be noted, every quantity on the right side of Equation 8 is computable by every communications node 102, as long as the communications nodes 102 have the eight quantities on the left sides of the reference equations.

Equation 8 is derived by averaging these two quantities $\Delta_1$ and $\Delta_2$, or:

$$\frac{\Delta_1 + \Delta_2}{2} = \frac{1}{2}[\beta_b(\alpha_b + t_1 + d) -$$
$$\beta_a(\alpha_a + t_1) + \beta_a(\alpha_a + t_2 + d) - \beta_b(\alpha_b + t_2)]$$
$$= \frac{\beta_a + \beta_b}{2}d + \frac{t_2 - t_1}{2}(\beta_a - \beta_b)$$

Equation 9

The first and second lines of the reference equations provide:

$$\tau_{a2} - \tau_{a1} = \beta_a(t_2 - t_1) + \beta_a d$$

Equation 10 or equivalently.

$$t_2 - t_1 = \frac{\tau_{a2} - \tau_{a1}}{\beta_a} - d$$

Equation 11

Substituting Equation 11 into Equation 9 gives:

$$\frac{\Delta_1 + \Delta_2}{2} = \frac{\beta_a + \beta_b}{2}d + \frac{\beta_a - \beta_b}{2}\left(\frac{\tau_{a2} - \tau_{a1}}{\beta_a} - d\right)$$
$$= \beta_b d + \frac{1}{2}\left(1 - \frac{\beta_b}{\beta_a}\right)(\tau_{a2} - \tau_{a1})$$

or equivalently the expression shown in Equation 8.

At step 1120, coordinate processor 604 computes the quantity $\beta_a d$ which is determined from $\beta_b d$. Note that $$\beta_a d = \frac{\beta_a}{\beta_b}\beta_b d,$$

and communications nodes 102 know both right hand side quantities.

At step 1124, coordinate processor 604 determines the internodal distance "d" between communications nodes A and B. It is presumed that both $\beta_a$ and $\beta_b$ are close to one, so that the quantities $\beta_a d$ and $\beta_b d$ are both good estimates of d. Therefore, in an embodiment either quantity $\beta_a d$ or $\beta_b d$ is selected by coordinate processor 604 as the distance "d." In another embodiment, the communications node 102 selects the expression having the drift rate for its respective clock 408. For instance, communications node A would select $\beta_a d$ and communications node B would select $\beta_b d$. In another embodiment, each communications node A and B computes the average of the quantities $\beta_a d$ or $\beta_b d$.

The above steps have been described with reference to only two communications nodes 102. However the present invention is scaleable to determine the positions of more than two communications nodes. As such, base node 102a uses the above steps to calculate the distance "d" to each of its neighboring nodes 102b–102p. Therefore, at step 1128, coordinate processor 604 determines whether the internodal distance to all neighboring nodes 102b–102p have been computed. If not, steps 1104–1124 are repeated. Otherwise, the control flow passes to step 1132.

At step 1132, coordinate processor 604 produces a pointset to determine the topology for communications nodes 102. The present invention is premised on the assumption that base node 102a is positioned at the coordinate point (0,0) in a x-y coordinate system. In other words, all communications nodes 102 believe they are located at the origin of system 100. If there is at least one other communications node 102, the neighboring node 102b–102p with the minimum node identifier (as determined by the node identification number) is considered to be the first reference node, and is positioned on the positive x-axis. If there are three or more non-collinear neighboring nodes 102b–102p, the neighboring node 102b–102p with the minimum node identifier among those neighborhood nodes 102b–102p that are neither base node 102a, the first reference node, nor collinear with base 102a and the first reference node, is denoted the second reference node and is positioned in the upper half-plane. Thus, the placement of the first reference node has the effect of fixing a particular rotational orientation, while the placement of the second reference node locks in a particular reflective orientation.

It is also presumed that the computation phase is executed only once. That is, once a given pointset is determined, communications nodes 102 entering or leaving are added or removed incrementally. Therefore, it is conceivable that the actual first reference node is, after some time, not the non-base local node with the minimum node identifier.

Figure 12:
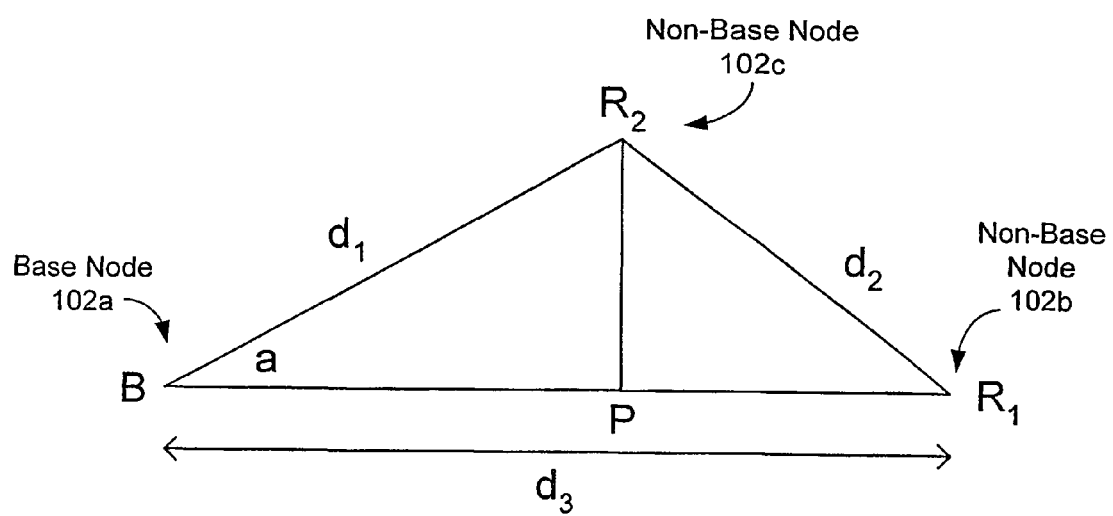
FIG. 12 illustrates a coordinate diagram for positioning wireless communications nodes according to an embodiment of the present invention.

Upon determining the base node 102a and the first two reference nodes 102b–102p, the pointset is constructed by coordinate processor 604. FIG. 12 shows the internodal distances among base node 102a and the first and second reference nodes 102b–102c. The law of cosines provide:

$$\cos(a) = \frac{d_1^2 + d_3^2 - d_2^2}{2d_1 d_3}$$

Once $\cos(\alpha)$ is computed, coordinate processor 604 computes the lengths of segments $\overline{BP}$ and $\overline{R_2P}$, which give respectively the x and y coordinates of second reference node 102c, since base node 102a is positioned at point (0,0), first reference node 102b on the positive x-axis, and second reference node 102c in the upper half-plane.

Coordinate processor 604 then proceeds to compute the rest of the pointset. For each remaining non-base or reference node 102, coordinate processor 604 determines two candidate positions using distances between the remaining node, base node 102a, and first reference node 102b, as above. Next, coordinate processor 604 uses the distance between the node in question and second reference node 102c in order to choose between the two candidate positions. Thus, once coordinate processor 604 has determined the positions of the two reference nodes, the position of each additional node is determined using only the distances from it to the base and reference nodes.

In an embodiment, coordinate processor 604 uses more of the internodal distance information to obtain better estimates on point positions. Thus somewhere in between using a linear amount of data and an $n^2$ amount of data (where n is the total number of communications nodes 102) lies an amount that will efficiently provide the desired accuracy.

After determining the topology, the control flow of flowchart 1100 ends as indicated by step 1195. Although above steps lead to the determination of local topology, the present invention also allows each communications node 102 to evaluate overlapping neighborhoods to generate consistent pictures of the network topology. Additionally, the present invention enables each communications node 102 to combine local topology information generated by neighboring nodes to derive a global network topology. Since the present invention does not requires a central authority or node, each communications node 102 is considered to be homogeneous. Each communications node 102 enters and leaves system 100 at any time. In addition, in an embodiment, the present invention permits groups of cooperating sensor nodes 102 to detect and position certain classes of objects that do not, themselves, contain sensor nodes 102. Among the non-sensor objects that are detectable include vehicles, such as automobiles, aircrafts, submarines, ships, and the like. As such, the present invention offers the added, advantage of collision detection and avoidance even when other vehicles are not equipped with sensor units.

Figure 13:
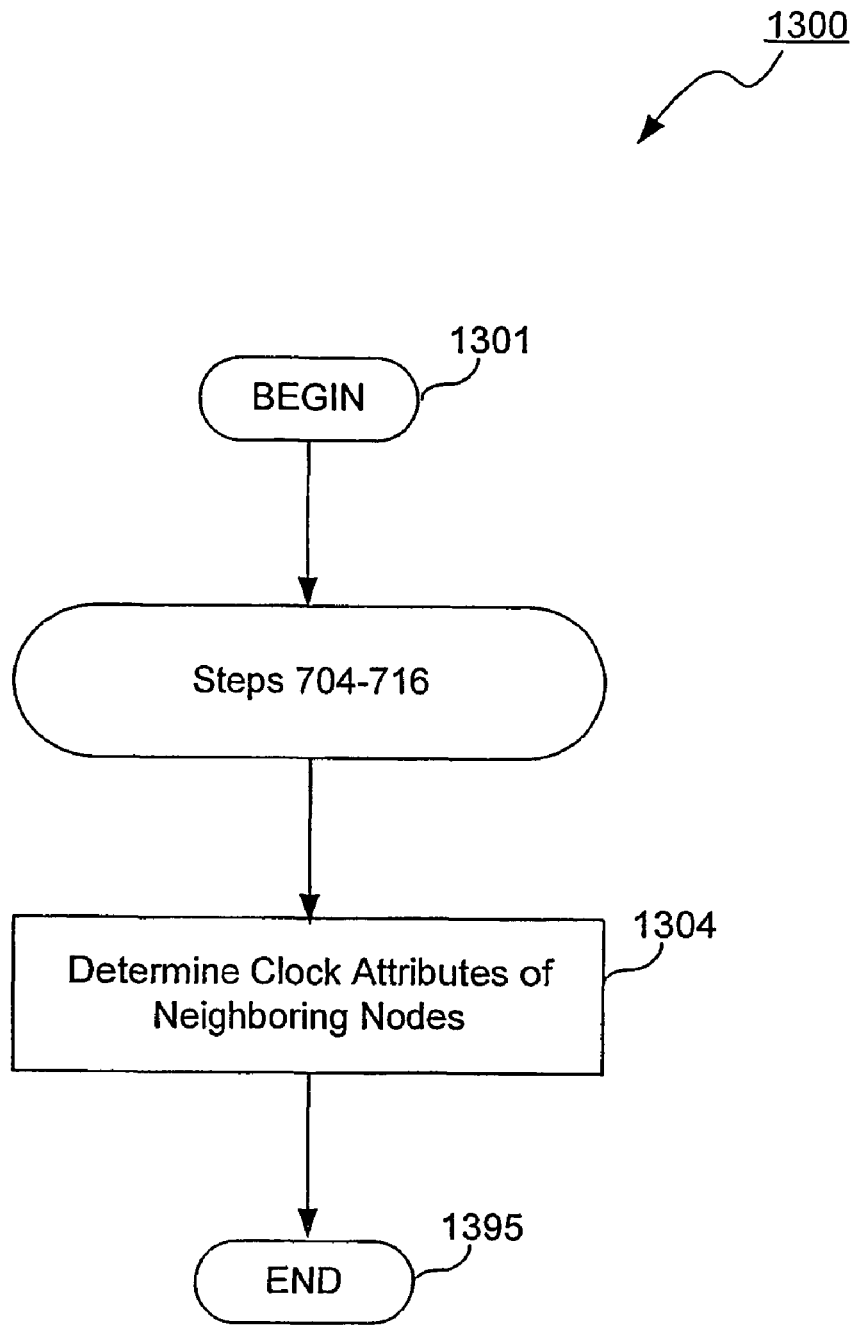
FIG. 13 illustrates an operational flow diagram for determining clock characteristics of wireless communications nodes according to an embodiment of the present invention.

In addition to determining the spatial locations, the present invention also determines the clock attributes of each communications nodes 102. Referring to FIG. 13, flowchart 1300 represents the general operational flow of another embodiment of the present invention. More specifically, flowchart 1300 shows an example of a control flow for determining the clock attributes of multiple communications nodes 102.

The control flow of flowchart 1300 begins at step 1301 and passes immediately to steps 704–716 to execute the measurement, information exchange, and computation phases. However, the computation phase continues into step 1304.

At step 1304, clock attribute processor 608 processes the information computed at step 716, to determine the clock attributes of neighboring nodes 102b–102p. As described in reference to FIG. 11, upon completion of step 1128, coordinate processor 604 will have computed, for each communications node 102, all of the τ values in addition to $$\frac{\beta_a}{\beta_b}, \beta_a d$$

and $\beta_b d$. Moreover, assuming communications node A is base node 102a and communications node B is neighboring node 102b, the value of global time "t" can be determined from:

$$\tau_a(t) = \beta_a(\alpha_a + t) = \beta_a \alpha_a + \beta_a t \qquad \text{Equation 12}$$

where "β" is the drift rate and "βα" is the offset for the local clock of the designated communications node 102. Therefore, for a reading of the local clock at communications node A, the global time "t" can be determined by:

$$t = \frac{\tau_a(t)}{\beta_a} - \alpha_a \qquad \text{Equation 13}$$

Using the above value for t, the reading of local clock 408 from communications node B is determined by:

$$\tau_b(t) = \qquad \text{Equation 14}$$
$$\beta_b(\alpha_b + t) = \beta_b\left(\alpha_b + \left(\frac{\tau_a(t)}{\beta_a} - \alpha_a\right)\right) = \beta_b(\alpha_b - \alpha_a) + \frac{\beta_b}{\beta_a}\tau_a(t)$$

Therefore, clock attribute processor 608 of base node 102a (e.g., communications node A) determines the reading of clock 408 on a neighboring node 102 (e.g., communications node B) by computing the value of $\beta_b(\alpha_b - \alpha_a)$, computing the ratio $$\frac{\beta_a}{\beta_b},$$

and taking a reading from local clock 408 of base node 102a.

The value $\beta_b(\alpha_b - \alpha_a)$ is determined by solving both of the equations in the first line of the reference equations for the a term, as follows:

$$\alpha_a = \frac{\tau_{a1}}{\beta_a} - t_1 \qquad \text{Equation 14}$$

$$\alpha_b = \frac{\tau_{b1}}{\beta_b} - t_1 - d \qquad \text{Equation 15}$$

so that, $$\beta_b(\alpha_b - \alpha_a) = \qquad \text{Equation 16}$$
$$\beta_b\left(\left(\frac{\tau_{b1}}{\beta_b} - t_1 - d\right) - \left(\frac{\tau_{a1}}{\beta_a} - t_1\right)\right) = \tau_{b1} - \beta_b d - \frac{\beta_b}{\beta_a}\tau_{a1}$$

Thus, each communications node 102 utilizes the reference equations to determine both a very good estimate for the internodal distance "d", and the values of the respective clocks 408 of neighboring nodes 102b–102p based on readings of its local clock 408. The clock attributes, as describe above, are used by each communications node 102 to synchronize its local clock 408 for subsequent operations. After determining the clock attributes, the control flow of flowchart 1300 ends as indicated by step 1395.

Although in the preferred embodiment base node 102a transmits and receives measurement messages, base node 102a is operable to function in passive mode to only receive measurement messages from each neighboring node 102b–102p. The computation phase is adjusted to calculate the position and synchronization data from received tuples accordingly.

IV. Conclusion

FIGS. 1–13 are conceptual illustrations that allow an easy explanation of the present invention. That is, the same piece of hardware or module of software can perform one or more of the blocks. It should also be understood that embodiments of the present invention can be implemented in hardware, software, or a combination thereof In such an embodiment, the various components and steps would be implemented in hardware and/or software to perform the functions of the present invention.

Additionally, the present invention (e.g., system 100 and/or any part thereof) can be implemented in one or more computer systems or other processing systems. In fact, in an embodiment, the invention is directed toward one or more computer systems capable of carrying out the functionality described herein.

Figure 14:
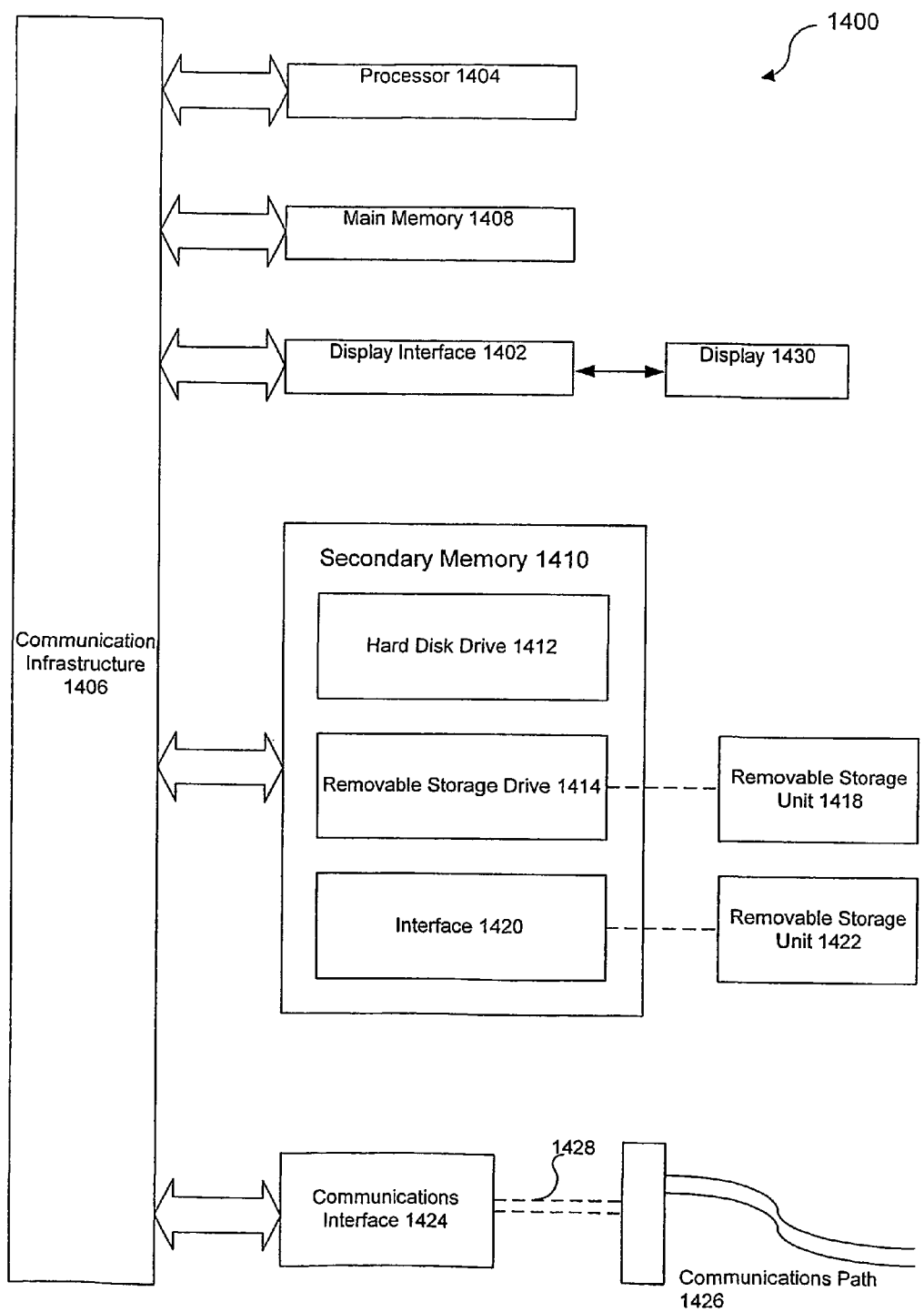
FIG. 14 illustrates a block diagram of an example computer system useful for implementing the present invention.

Referring to FIG. 14, an example computer system 1400 useful in implementing the present invention is shown. The computer system 1400 includes one or more processors, such as processor 1404. The processor 1404 is connected to a communication infrastructure 1406 (e.g., communications bus, crossover bar, or network). Various software embodiments are described in terms of this exemplary computer system. After reading this description, it will become apparent to a person skilled in the relevant art(s) how to implement the invention using other computer systems and/or computer architectures.

Computer system 1400 can include a display interface 1402 that forwards graphics, text, and other data from the communication infrastructure 1406 (or from a frame buffer not shown) for display on the display unit 1430.

Computer system 1400 also includes a main memory 1408, preferably random access memory (RAM), and can also include a secondary memory 1410. The secondary memory 1410 can include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well-known manner. Removable storage unit 1418, represents a floppy disk, magnetic tape, optical disk, etc. which is read by and written to removable storage drive 1414. As will be appreciated, the removable storage unit 1418 includes a computer usable storage medium having stored therein computer software and/or data.

In alternative embodiments, secondary memory 1410 can include other similar means for allowing computer programs or other instructions to be loaded into computer system 1400. Such means can include, for example, a removable storage unit 1422 and an interface 1420. Examples of such can include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 can also include a communications interface 1424. Communications interface 1424 allows software and data to be transferred between computer system 1400 and external devices. Examples of communications interface 1424 can include a modem, a network interface (such as an Ethernet card), a communications port, a PCMCIA slot and card, etc. Software and data transferred via communications interface 1424 are in the form of signals 1428 which can be electronic, electromagnetic, optical or other signals capable of being received by communications interface 1424. These signals 1428 are provided to communications interface 1424 via a communications path (i.e., channel) 1426. This channel 1426 carries signals 1428 and can be implemented using wire or cable, fiber optics, a phone line, a cellular phone link, an RF link and other communications channels.

In this document, the terms "computer program medium" and "computer usable medium" are used to generally refer to media such as removable storage drive 1414, a hard disk installed in hard disk drive 1412, and signals 1428. These computer program products are means for providing software to computer system 1400. The invention is directed to such computer program products.

Computer programs (also called computer control logic) are stored in main memory 1408 and/or secondary memory 1410. Computer programs can also be received via communications interface 1424. Such computer programs, when executed, enable the computer system 1400 to perform the features of the present invention as discussed herein. In particular, the computer programs, when executed, enable the processor 1404 to perform the features of the present invention. Accordingly, such computer programs represent controllers of the computer system 1400.

In an embodiment where the invention is implemented using software, the software can be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of determining the location of communications nodes in a distributed network, comprising the steps of:
   creating, at a first node, a transmit timestamp for a message as said message is transmitted by said first node to a second node;
   creating, at said second node, a receive timestamp as said message is received by said second node;
   storing, at said second node, a measurement tuple corresponding to said message, wherein said storing includes recording an identifier for said first node, said transmit timestamp from said first node and said receive timestamp from said second node;
   exchanging, by said second node, said measurement tuple with said first node, so that said first node and said second node each have a record of all measurement tuples stored therein; and
   analyzing said record of measurement tuples to determine the location of said first node and said second node with respect to each other.

2. A method of claim 1, wherein said storing step is repeated at least once prior to said exchanging step.

3. A method of claim 1, wherein said analyzing step comprises determining a distance between said first node and said second node.

4. A method of claim 1, wherein said analyzing step comprises determining spatial coordinates for said first node and said second node.

5. A method of claim 1, wherein said exchanging step comprises exchanging, by said second node, said measurement tuple with multiple nodes, so that said second node and said multiple nodes each have a record of all measurement tuples stored therein; whereby said analyzing step determines the location of said second node and said multiple nodes with respect to each other.

6. A method of claim 1, further comprising the step of determining clock attributes for at least one of said first node and said second node.

7. A method of claim 6, further comprising the step of determining clock attributes as a measure of relative offset and/or drift for at least one of said first node and said second node.

8. A method of claim 6, further comprising the step of synchronizing said first node and said second node with respect to each other based on one of said clock attributes.

9. A method of claim 1, further comprising the step of determining the location of a mobile sensor node while said mobile sensor node is in motion, wherein said mobile sensor node is one of said first node and said second node.

10. A method of claim 1, further comprising the step of determining the location of a sensor node in a wireless network, wherein said sensor node is one of said first node and said second node.

11. A method of claim 1, further comprising the step of transmitting said message and/or exchanging said measurement tuple at a UHF frequency.

12. A method of claim 1, wherein at least one of said first node and said second node is selected from a group consisting of an automobile, aircraft, submarine, and ship.

13. A method of claim 1, further comprising the step of determining the location of an object that is not a sensor node.

14. A method of claim 1, further comprising the steps of:
creating, at said second node, a transmit timestamp for a second message as said second message is transmitted by said second node to said first node;
creating, at said first node, a receive timestamp as said second message is received by said first node;
storing, at said first node, a second measurement tuple corresponding to said second message, wherein said storing includes recording an identifier for said second node, said transmit timestamp from said second node and said receive timestamp from said first node; and
exchanging, by said first node, said second measurement tuple with said second node, so that said second node and said first node each have a record of all second measurement tuples stored therein, wherein said analyzing step processes both sets of measurement tuples to determine the location of said first node and said second node with respect to each other.

* * * * *